April 14, 1953 G. L. GRISDALE 2,635,143

VARIABLE ELECTRICAL FILTER

Filed Jan. 4, 1949 2 SHEETS—SHEET 1

Inventor:
George Lambert Grisdale;
By his attorneys,
Baldwin, Wight, & Brevost

Inventor:
George Lambert Grisdale;
By his attorneys,
Baldwin, Wight, + Brevost

Patented Apr. 14, 1953

2,635,143

UNITED STATES PATENT OFFICE 2,635,143

VARIABLE ELECTRICAL FILTER

George Lambert Grisdale, Great Baddow, Chelmsford, England, assignors to Marconi's Wireless Telegraph Company Limited, London, England, a company of Great Britain Application January 4, 1949, Serial No. 69,146
In Great Britain February 24, 1948

2 Claims. (Cl. 178—44)

This invention relates to variable electrical filters and has for its object to provide improved and simple filters of variable band pass characteristics, suitable for use in radio, high speed telegraphy and for similar purposes.

According to this invention in its broadest aspect a variable band pass filter arrangement comprises a first filter, a second filter, and, between said filters, a frequency changer having a variable local oscillation frequency, the whole arrangement being such that, by varying said local oscillation frequency, the pass band of one filter may, in effect, be slid to a variable extent across the pass band of the other so that the whole arrangement constitutes a band pass filter whose pass width may be adjusted by adjusting the local oscillation frequency.

An important advantage of the invention lies in the fact that the separate filters need not be designed to have sharp cut-off on both sides of their pass bands but only on one side and, in many cases they may be merely high-pass or low pass filters.

Preferably the first filter is preceded by a second frequency changer and the second filter is followed by a third frequency changer both of which have variable local oscillation frequencies which are so related to that of the first oscillation frequency that the mid-frequency of the variable width band from the second frequency changer remains constant as the width of said band is varied. In such a case the three oscillation frequencies may be generated by three oscillators which are gang-controlled or they may be derived from means including a common frequency source.

The two filters above referred to and employed for variable band width reception may also be used for the separation of sidebands in single sideband systems and, by providing suitable switching, variable selectivity and sideband separation may be obtained in one equipment.

The invention is illustrated in the accompanying drawings which illustrate a number of embodiments which will be described with examples of actual frequencies. It is to be understood, however, that these frequencies are given by way of example only and to assist in clear understanding, the invention being in no way limited to these examples.

Figure 1:
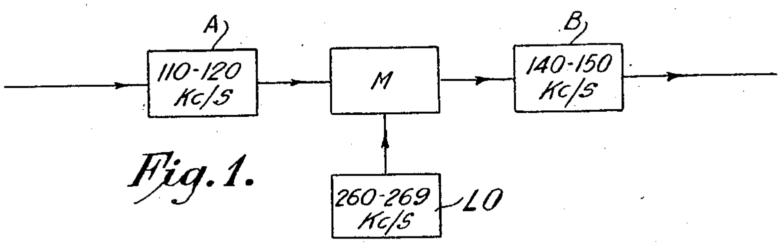
Figure 2:
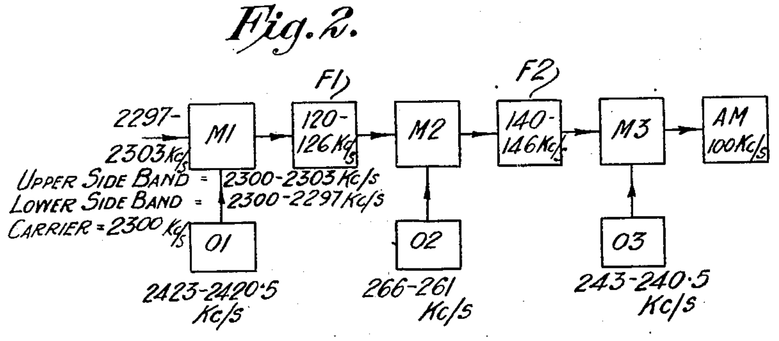
Figure 3:
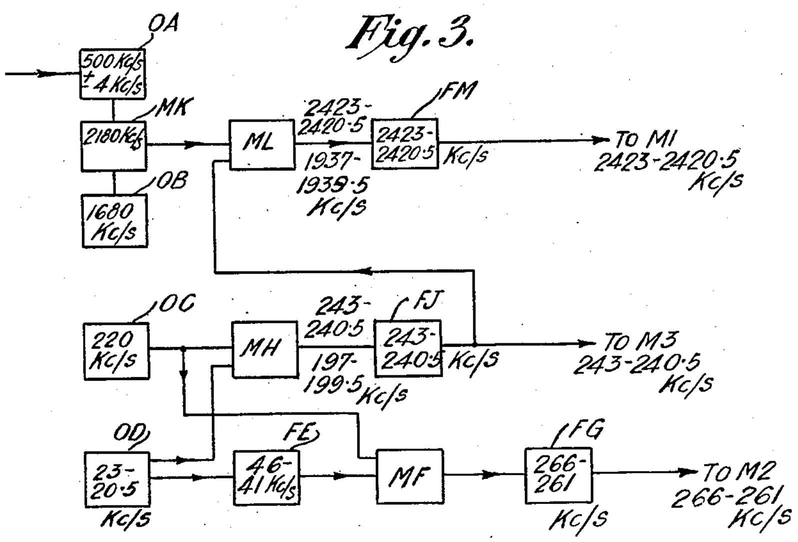

Figs. 1 to 3 inclusive are block diagrams illustrating variable band-pass filters according to my invention.

Figure 4:
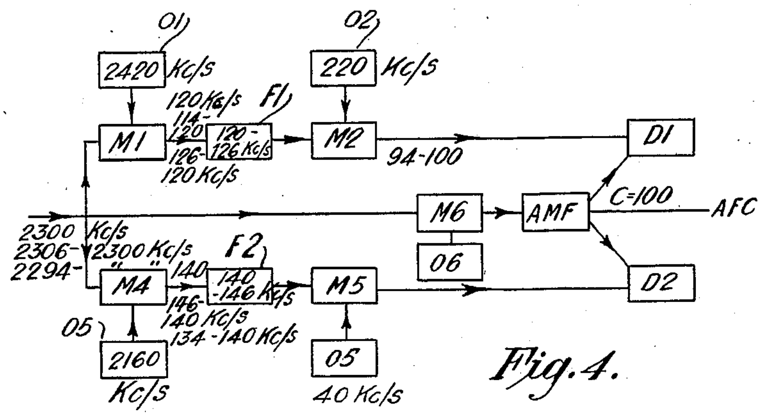
Figure 5:
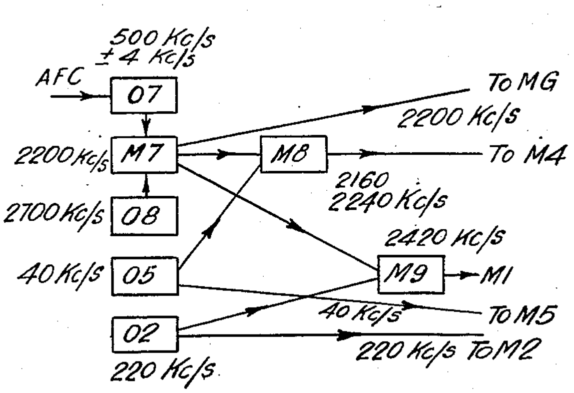

Figs. 4 and 5 are block diagrams of receivers embodying the invention.

Referring to Figure 1 which shows one embodiment of the invention as applied to provide variable band-pass selectivity in the intermediate frequency (I. F.) stages of a superheterodyne receiver having an I. F. in the neighbourhood of 115 kc./s. I. F. input signals are applied to a first filter A with a pass band of 110–120 kc./s. followed by a mixer stage M followed by a second filter B with a pass band of 140–150 kc./s. A local oscillator LO which is variable over a frequency range of 260–269 kc./s. is associated with the mixer. The two filters need not have sharp cut-off on both sides of their pass bands; for example, in the present case, they may be designed to have sharp cut-off at the upper frequency limits only.

It will be seen that, in the above embodiment when the local oscillator LO is adjusted to 260 kc./s. the band of frequencies accepted by the first filter A (110–120 kc./s.) will be changed at the mixer to 150–140 kc./s. and will therefore pass the second filter B. When, however, the local oscillator is adjusted to 269 kc./s. the band at the mixer output will be 159–149 kc./s. and of this only the portion 150–149 kc./s. (corresponding to the portion 119–120 kc./s. of the input band to the first filter) will pass the second filter. In this way the local oscillator provides an adjustment of the overall pass band width of from 10 kc./s. to 1 kc./s.

It will be observed that, with the embodiment just described, the mid-frequency of the band passed varies as the pass band width is adjusted. In the actual example the input and output mid-frequencies are, respectively, 115 kc./s. and 145 kc./s. when the band width is adjusted to 10 kc./s. and these values change to 119.5 and 149.5 kc./s. when the band width is reduced to 1 kc./s. This may, in many cases, be objectionable: for example it would cause the beat note of a C. W. receiver to vary and would lead to difficulties with automatic frequency control (A. F. C.) in the case of a receiver having and A. F. C. system operated by the output from the second filter B.

This defect can be avoided by providing additional frequency changers with variable local oscillation frequencies in cascade one each side of an arrangement as above described. Such an improved arrangement is illustrated in Figure 2 as applied to the case of a triple detection superheterodyne receiver having, in a first intermediate frequency circuit, a carrier of 2300 kc./s. with an upper side band extending to 2303 kc./s. and a lower side band extending to 2297 kc./s. in Figure 2, in which the present invention is applied to this case to provide a high and variable selectivity, the band 2297–2303 kc./s. is applied to a mixer M1 with which is associated a local oscillator O1 which is variable over the range 2423–2420.5 kc./s. Following the mixer M1 is a band pass filter F1 for the range 120–126 kc./s. and having a sharp cut off at the lower limit only. This is in turn followed by a mixer M2 with which is associated a local oscillator O2 variable over the range 266–261 kc./s. The mixer M2 feeds into a band pass filter F2 for the range 140–146 kc./s. again having a sharp cut-off at the lower frequency limit only. Output from this filter is taken to a mixer M3 with which is associated a local oscillator O3 variable over the range 243–240.5 kc./s. The three local oscillations are co-related in their variation in such manner as to maintain a constant mean or carrier frequency (100 kc./s. in this case) in the output from the mixer M3 which, as indicated, feeds into a 100 kc./s. amplifier AM. Thus, when the three local oscillations are, respectively 2423, 266 and 243 kc./s., the final output will consist of a carrier at 100 kc./s. and side bands of 100–97 kc./s. and 100–103 kc./s. giving a band width of 6 kc./s. When the three local oscillations are, respectively 2420.5, 261 and 240.5 kc./s. the final output consists of the carrier at 100 kc./s. and side bands of 100–99.5 kc./s. and 100–100.5 kc./s.

The three local oscillations can, theoretically, be derived from three gang-controlled oscillators but it is practically much better to derive them from means including a common source. In one example of this nature suitable for use in the embodiment just described and illustrated in Figure 3 there are employed four oscillators OA, OB, OC, OD respectively in association with mixers and band pass filters. Oscillator OA is of 500 kc./s.±4 kc./s.; oscillator OB is crystal controlled at 1680 kc./s.; oscillator OC is crystal controlled at 220 kc./s.; and oscillator OD is variable over the range 23–20.5 kc./s. A filter FE selects the second harmonic range 46–41 kc./s. from oscillator OD and applies it to a mixer MF to which is also applied the 220 kc./s. from oscillator OC. A filter FG selects from the output from MF the band 266–261 kc./s. to constitute the variable local oscillation which is applied to the mixer M2 in Figure 2 and is shown in that figure as derived from an oscillator O2 The output from oscillator OD is also fed to a mixer MH which also receives output from oscillator OC and a filter FJ selects, from the output from MH the band 243–240.5 to constitute the variable local oscillation frequency for the mixer M3 in Figure 2 and shown in that figure as derived from oscillator O3. Outputs from oscillators OA and OB are combined in a mixer-selector MK which selects the frequency of 2180 kc./s. and feeds it to a mixer ML which also receives the band of 243–240.5 kc./s. from filter FJ. A filter FM selects from the output from mixer ML the band 2423–2430.5 kc./s. required as the variable local oscillation frequency for the mixer M1 in Figure 2 and shown in that figure as derived from O1.

Another advantage of the invention lies in the fact that it lends itself to the ready construction of a receiver which, by a simple switching change, can be readily changed over from high, variable selectivity double side band reception on one channel to single side band double channel reception. Thus, for example, by changing the connections of the elements contained in the high variable selectivity double side band single channel arrangement illustrated in Figure 2 and adding a comparatively few elements as represented in Figure 4 the said arrangement can be changed over to double channel single side band reception, elements provided for use in single channel reception being thus used for double channel reception with the addition of further mixers and local oscillators. The switching changes for changing over to double channel reception are such as to produce the circuit of Figure 4 in which there are three parrallel paths, one for each side band and one for the carrier, the carrier and the two side bands—namely 2300 kc./s., 2300–2306 kc./s. and 2300–2294 kc./s.—being applied to all three paths in parallel. Such switching arrangement provides circuit connections in the upper side band path through the mixer M1, with which is associated the oscillator O1 (adjusted to 2420 kc./s.) that is followed by the filter F1 (120–126 kc./s.) which is in turn followed by the first mixer M2 with which is associated the oscillator O2 (adjusted to 220 kc./s.) The output from M2 comprises the lower side band 94–100 kc./s. and is taken to one demodulator D1 to which is also applied carrier (at 100kc./s.) from the carrier path. The lower side band path contains an additional mixer M4, with which is associated an oscillator O3 at 2160 kc./s., followed by the filter F2 (140–146 kc./s.) in turn followed by another mixer M5 with which is associated an oscillator O5 adjusted to 40 kc./s. The output from this mixer, comprises the upper side band 100–106 kc./s. and is taken to another demodulator D2 to which is also applied 100 kc./s. carrier from the carrier path. The carrier path consists simply of a mixer M6 with which is associated an oscillator O6 at 2200 kc./s. and which may be followed by an amplifying carrier filter AMF at 100 kc./s. Carrier output from the amplifier AMF may be used for automatic frequency control as indicated by the reference AFC. The same elements are indicated by the same references in Figures 2 and 4 since the latter figure is a re-connection of the elements of the former figure with further elements added.

The oscillator O6 of the carrier path, and the oscillators M1, M4 of the two side band paths should be constituted by different output circuits of a multiple oscillator unit on the lines of that already described as preferred for single channel reception. A convenient arrangement is shown in Figure 5 and comprises four oscillators O7, O8, O5 and O2 of, respectively, 500 kc./s.±4 kc./s.; 2700 kc./s. (crystal controlled); 40 kc./s. (crystal controlled) and 220 kc./s. (crystal controlled). The oscillators O7, O8 (of which the former is subjected to automatic frequency control as indicated by the legend AFC) feed into a mixer-selector M7 which selects 2200 kc./s. for use as the carrier path local oscillation for feeding to mixer M6 (Figure 4). The output from mixer M7 is fed to two other mixers M8, M9 of which M8 also receives the 40 kc./s. oscillation from O5 to produce the required 2160 kc./s. oscillation for the mixer M4 (Figure 4) in the lower side band path, and the other M9 also receives the 220 kc./s. from O2 to produce the 2420 kc./s. oscillation required for the mixer M1 (Figure 4) in the upper side band path. The two remaining oscillations of 40 kc./s. (for M5 in Figure 4) and 220 kc./s. (for M2 in Figure 4) are derived direct from the oscillators O5 and O2 respectively. The same elements are indicated by the same references in Figures 4 and 5.

I claim:

1. A variable band pass filter arrangement comprising in combination a first band pass filter of a predetermined band width and having a sharp cut off on at least one side of its pass band, a second band pass filter of the same order of band width and having a sharp cut off on at least one side of its pass band, a frequency changer, means for applying the output from the first filter as one of the inputs to said frequency changer, a local oscillator variable over a predetermined frequency range of the same order as the pass bands of said filters, means for applying oscillations from said local oscillator as the second input to said frequency changer, and means for applying the output from said frequency changer as input to said second filter, said predetermined frequency range being so chosen in relation to said pass bands that the resultant frequency band derived from the combinations of the frequencies of the pass band of said first filter with one end frequency of said frequency range overlaps the pass band of said second filter by an amount different from that by which the resultant frequency band derived from the combinations of the frequencies of the pass band of said first filter with the other end frequency of said frequency range overlaps the pass band of said second filter, a second frequency changer preceding the first filter and connected to apply its output as input thereto, a second variable frequency local oscillator feeding into said second frequency changer, a third frequency changer fed by the second filter, a third variable frequency local oscillator feeding into said third frequency changer and means co-relating the frequencies from the three local oscillators to hold them during variation of their frequencies, in predetermined relation to maintain the mid-frequency of the variable band from the second frequency changer substantially constant during variation whereby the width of the band passed by the whole arrangement may be varied by varying said oscillator frequency over said frequency range.

2. A variable band pass filter arrangement comprising in combination a first band pass filter of a predetermined band width and having a sharp cut off on at least one side of its pass band, a second band pass filter of the same order of band width and having a sharp cut off on at least one side of its pass band, a frequency changer, means for applying the output from the first filter as one of the inputs to said frequency changer, a local oscillator variable over a predetermined frequency range of the same order as the pass bands of said filters, means for apply oscillations from said local oscillator as the second input to said frequency changer, and means for applying the output from said frequency changer as input to said second filter, said predetermined frequency range being so chosen in relation to said pass bands that the resultant frequency band derived from the combinations of the frequencies of the pass band of said first filter with one end frequency of said frequency range overlaps the pass band of said second filter by an amount different from that by which the resultant frequency band derived from the combinations of the frequencies of the pass band of said first filter with the other end frequency of said frequency range overlaps the pass band of said second filter, a second frequency changer preceding the first filter and connected to apply its output as input thereto, a second variable frequency local oscillator feeding into said second frequency changer, a third frequency changer fed by the second filter, a third variable frequency local oscillator feeding into said third frequency changer and gang control means for the three local oscillators to hold them during variation of their frequencies in predetermined relation to maintain the mid-frequency of the variable band from the second frequency changer substantially constant during variation whereby the width of the band passed by the whole arrangement may be varied by varying said oscillator frequency over said frequency range.

GEORGE LAMBERT GRISDALE.

References Cited in the file of this patent

UNITED STATES PATENTS

| Number | Name | Date |
|---|---|---|
| 1,830,896 | Wintrington | Nov. 10, 1931 |
| 2,282,974 | Koch | May 12, 1942 |
| 2,354,749 | Griffin | Aug. 1, 1944 |
| 2,364,863 | McLaughlin | Dec. 12, 1944 |
| 2,472,798 | Fredendall | June 14, 1949 |